United States Patent [19]

Bennett, Sr.

[11] 4,281,579

[45] Aug. 4, 1981

[54] TEACHING AID FOR KEYED MUSICAL INSTRUMENTS

[76] Inventor: Timothy J. Bennett, Sr., 309 Mary St., Westerville, Ohio 43081

[21] Appl. No.: 801,729

[22] Filed: May 31, 1977

[51] Int. Cl.³ .................... G09B 15/02; G09B 15/08
[52] U.S. Cl. ...................................... 84/478; 434/227
[58] Field of Search ................ 84/478, 464, 470, 471, 84/472, DIG. 22, 1.01, 1.03, 1.17, 1.24, 477 R, 467; 35/5, 6, 35 C, 35 R

[56] References Cited

U.S. PATENT DOCUMENTS

| 4,012,852 | 3/1977 | Journot | 35/35 C |
| 4,012,979 | 3/1977 | Wemekamp | 84/478 |
| 4,054,868 | 10/1977 | Rose | 84/470 R |

Primary Examiner—L. T. Hix
Assistant Examiner—S. D. Schreyer
Attorney, Agent, or Firm—Frank H. Foster

[57] ABSTRACT

A teaching aid for piano and other keyed musical instruments. The device has switches electrically connected to a matrix array and mechanically linked to each key for detecting each key depression, an LED associated with each key for signalling the keys which should be played and an alphanumeric display for showing notes in literal and octave notation and for showing the student's position in a composition or exercise. The displays are connected in a matrix array and along with the key sensing switches are connected through interface circuitry to a microcomputer. The microcomputer stores a sequence of musical steps forming a composition and compares played notes to the stored sequence. When the compared notes and the depressed keys are identical, the student is signalled and the microcomputer advances to the next musical step. When there is an error, the microcomputer recycles the same musical step. An external, auxiliary memory, such as a cassette tape, may be used for storage of data representing a variety of musical compositions. Suitable programming permits the apparatus to be used for preparing and storing lessons, such as by the manual input at the instruments keyboard of additional musical compositions. Unique interface circuitry provides improved LED display, minimizes circuit components and permits the key sensing switches and the displays for an 88-key instrument to be linked to a modern microprocessor through only 13 input/output terminals, including only 8 terminals for data transfer and 5 for addressing and control.

8 Claims, 1 Drawing Figure

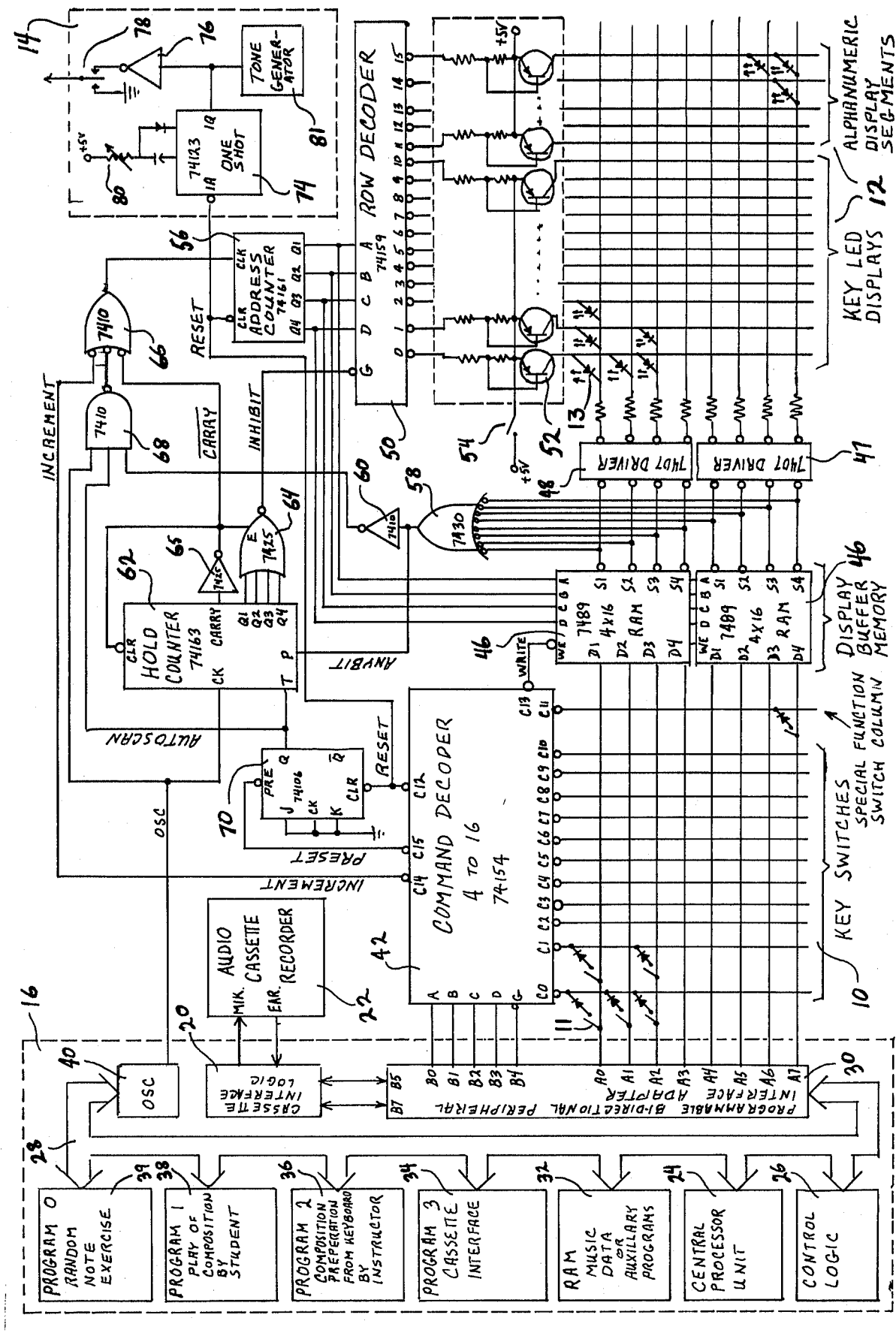

TEACHING AID FOR KEYED MUSICAL INSTRUMENTS

BACKGROUND OF THE INVENTION

This invention relates generally to an educational aid for use in teaching a student how to play keyed musical instruments and more particularly for displaying which notes should be played and for comparing the notes which are actually played by the student to the notes that should be played and for signalling to the student whether the student has played correctly.

A broad variety of electronic and mechanical devices for aiding in the instruction of musical instrument play have been described in the past and many are found in the United States Patent and Trademark Office in Class 84, subclasses 464 and 478.

For example, U.S. Pat. No. 3,552,256 discloses an apparatus having a light and a switch associated with each key which advances at a continuous uniform rate and compares single notes of a composition to played notes. It does not, however, accomodate chords and does not synchronize with the student.

U.S. Pat. No. 3,771,406 illustrates a digital data apparatus which displays single notes which should be played but can neither accomodate chords nor detect errors.

There is, therefore, a need for an instructional device which can operate in synchronism with the student's play, which can accomodate chords as well as a melody of single or multiple notes and which can detect and signal the occurence of any error including the playing of additional notes beyond the correct notes. There is further a need for a device which can also provide other types of musical exercises such as the random selection and display of notes in literal and octive notation for comparison with played notes and which can also be used by an instructor for the preparation of additional exercises or compositions for use by the student.

OBJECTS AND SUMMARY OF THE INVENTION

It is therefore an object of the present invention to provide a teaching aid which can display to the student the next key or keys to be played in a sequence of musical steps and which, upon the playing of keys by the student can detect any errors by the student and can signal the correctness or incorrectness of the student's play.

A further object of the invention is to provide such a teaching aid which can operate in synchronism with the student rather than independently at a preselected, continuous rate.

A further object of the present invention is to provide such a teaching aid which can display an indication of the student's position in the musical composition and which can further display musical notes in literal and octave notation.

A still further object of the invention is to provide an instruction aid which can automatically record exercises prepared by an instructor and entered via the instrument keyboard.

A still further object of the invention is to provide a teaching aid which can be used either with or without the sound producing portion of the keyboard musical instrument.

A further object of the present invention is to provide a teaching aid which utilizes the advantages of modern microprocessor devices.

Yet a further object of the invention is to provide a microcomputer-controlled teaching aid which permits the continuous and automatic scanning or cycling of the displays and display data independently of microcomputer control.

A further object of the present invention is to provide such a teaching aid in which all display light sources are connected in a matrix array and in which those columns of the matrix array in which no display is to be illuminated are skipped and in which additional time is spent turning on those displays in the matrix array columns in which the data requires illumination of the displays.

It is still a further object of the present invention to provide a microprocessor-controlled teaching aid in which all key sensing switches and display devices may be connected or interfaced to the microprocessor through only 13 of the conventional 16 input/output terminals of the modern microprocessors.

Further objects and features of the invention will be apparent from the following specification and claims when considered in connection with the accompanying drawings illustrating the preferred embodiment of the invention.

In summary, the apparatus of the invention includes a musical instrument keyboard, a plurality of two-state displays, one such display being in spatial correspondence with each key of the keyboard for designating its associated key, a plurality of alphanumeric displays, a switch means mechanically linked to each key on the keyboard for detecting each key depression, a signalling means and a digital data processing means. The digital data processing means is connected to the displays, the switch means and the signalling means and includes stored instructions and a memory means having a stored sequence of musical steps for comparing each of the stored musical steps in sequence to key depressions and signalling whether or not each of the steps and the key depressions are identical.

DESCRIPTION OF THE DRAWING

The FIGURE is a schematic and block diagram illustrating the preferred embodiment of the invention.

In describing the preferred embodiment of the invention, which is illustrated in the drawing, specific terminology will be resorted to for the sake of clarity. However, it is not intended to be limited to the specific terms so selected and it is to be understood that each specific term includes all technical equivalents which operate in a similar manner to accomplish a similar purpose. For example, the term "connection" is not limited to direct connection but includes effective connection through other circuit elements where such connection is known by those skilled in the art as being equivalent.

DETAILED DESCRIPTION

Many types of musical instruments are played by the fingering of a keyboard. These instruments include not only those having the conventional type of keyboard, such as a piano, organ or harpsichord, but also those requiring other types of key fingering such as a saxophone, clarinet, etc., in which discrete keys must be depressed for the playing of particular notes. The present invention, although most advantageously used with a keyboard having a large number of keys, such as a piano, may also be adapted for use with these other keyed instruments. It is not necessary that more than the keyboard portion of the instrument be used with the invention. The actual music generating portion of most instruments and therefore the major cost of the instrument can be eliminated while still retaining substantial instructional capability. In some cases this may be preferred because the student is forced to read the music rather than detect errors by ear.

A. The Circuit

The preferred embodiment of the invention has an electrical switch means which is mechanically linked to each key on the keyboard for the purpose of detecting each key depression. It also has a plurality of alphanumeric displays and a plurality of two-state displays, such as light emitting diodes or LED's, which have an off state and an on state. A different one of these two-state displays is associated with or in spatial correspondence with each key of the keyboard. The purpose of such two-state displays is to designate the particular key or keys which should be played by the student.

Preferably each two-state display is physically located immediately adjacent a different, associated key and is illuminated to designate its adjacent key. Alternatively, a duplicate representation of a keyboard may be used with the two-state displays to designate the keys.

The preferred embodiment also has a signalling means such as a tone generator. All of these elements of the preferred embodiment are connected to digital data processing circuitry which includes both stored instructions and a memory having some stored sequence of musical steps. Among other things the digital data processing circuitry compares each of the stored musical steps in sequence to the key depressions made by the student and signals whether or not each of the stored steps and the depressions are identical.

Referring now to the figure, each of the key sensing switches, such as switch 11 which are mechanically linked to the keys of the keyboard, are series connected to a diode. The diode-switch pairs for each key are connected in a switch matrix array 10. One LED, such as LED 13, is physically located either immediately adjacent each key of the keyboard or on the duplicate representation of the keyboard so that each such two-state, illuminable LED display is in spatial correspondence with each key of the keyboard. These LED displays are electrically connected in a display matrix array 12. Also connected in the display matrix array 12 are the individual segments for the alphanumeric displays.

The figure shows an 8×12 switch matrix array 10 to accomodate 88 musical instrument keys and some special purpose or control switches. It also shows an 8×11 portion of the display matrix array 12 to accomodate 88 LED displays, one for each key, and an 8×5 portion of the display matrix array 12 for the individual segments of the alphanumeric displays. Although various quantities of alphanumeric display digits may be utilized, I have illustrated the use of five digits each having seven segments and a decimal point.

The special purpose switch, referred to in the above paragraph, may be a special function selector switch means which is connected in the switch matrix array in order to permit the instrument keys to be used for manually selecting additional modes of operation. It would be used in the conventional manner so that the computer, through its software could, upon sensing depression of such a special switch means, transfer control to another program or subroutine within the program.

The FIGURE also illustrates a signalling means 14 in the form of a tone generator and a microcomputer indicated generally as 16. The remaining circuitry illustrated in the FIGURE provides an interfacing, digital data circuit means which is connected to the displays, the switch means and the signalling means for interfacing data transfer from the key switch means 10 to the microcomputer 16 and from the microcomputer 16 to the display matrix 12 and the signalling means 14 and for controlling the displays and the signalling means 14.

The microcomputer 16 is not shown in detail since so many of these devices have become available and their operation is so well known to those skilled in the art. While it probably would be more cost effective to utilize conventionally available microcomputer components to custom design a microcomputer for the preferred embodiment of the invention, there are also readily available, off-the-shelf microcomputer systems which may be used in the embodiment of the invention. For example, I have constructed an embodiment of the invention utilizing a KIM I microcomputer manufactured by MOS Technology Company. The microcomputer is connected through its cassette interface logic 20 to an auxiliary or external memory such as a magnetic, audio cassette tape player 22, floppy disc or other such auxiliary memory device familiar to those skilled in the art. As is conventional in the microcomputer art, this auxiliary or external memory may be used to provide data and instructions for the microcomputer and if an external memory with both read and write capability is used, such as a magnetic tape, it may also be used for storing data transferred from the microcomputer 16.

As is conventional in the microcomputer art, the microcomputer 16 comprises a central processing unit 24 and control logic 26 which is interconnected through a data, address, and control bus 28 to a programmable, bidirectional, peripheral interface 30 having sixteen terminals, a random access memory 32 and read only memories 34, 36, 38 and 39 for the storage of program instructions. The microcomputer is also provided with an oscillator 40 for providing clock pulses.

One set of lines from the key switch matrix array 10 is connected to outputs C0 through C11 of a 4 to 16 decoder 42. The decoder 42 translates the four-bit binary input at its inputs A, B, C and D to an output or true level at one of its 16 outputs C0 through C15. The decoder 42 is selected or enabled at its input G, and may, for example be a SN74154 available from Texas Instruments. The other set of lines of the key switch matrix array 10 is connected to data input/output terminals A0 through A7 of the microcomputer interface adapter 30. The microcomputer is able to scan the key switches and determine which of the switches have been closed by the playing of the key by the student or instructor. This is accomplished by strobing in sequence the first set of key switch matrix lines connected to outputs C0 through C11 of the decoder 42 and during each strobe, imputing at inputs A0 through A7 and storing the levels which appear at these inputs. Each closed switch will cause the strobe level to be applied to its connected data input terminals A0 through A7. The diodes prevent the formation of "sneak paths" which would cause erroneous strobe levels to appear at other input terminals during the scanning. Therefore the blocking diodes, in series with each sensing switch, permit simultaneous sensing of any combination of switches while preventing crosstalk between the switch columns.

One unique feature of the present invention is that the same input/output terminals A0 through A7 which are used for sensing the key switches are also used for transferring data out to the display matrix array 12, thus utilizing the full potential of the bi-directional port. This is accomplished by transferring the display data to a random access display buffer memory 46 consisting of a pair of 4×16, SN 7489 RAMs available from Texas Instruments. Then, sequentially and in a continuous endless cycle the display data are applied to the display matrix array 12.

The FIGURE illustrates that the outputs S1 through S4 of each of the display buffer memory 46 RAM devices connected through SN 7407 drivers 47 and 48 available from Texas Instruments to a first set of lines of the display matrix array 12. The inputs D1 through D4 of each of the SN 7489 RAMs in the display buffer memory 46 are also connected to the I/O terminals A0 through A7 so that when these RAM chips are selected by the output C13 of the decoder 42 and switched to the writing mode, they will store the data presented by the microcomputer at the I/O terminals A0 through A7.

The remaining circuitry, not including the signalling means 14, is connected to outputs C12, C14 and C15 of the decoder 42 to the address inputs A, B, C and D of the display buffer memory 46 and to the second (vertical in the FIGURE) set of lines of the display matrix array 12 for the purpose of continuously cycling the display data which is stored in the display buffer memory 46 to apply it to the LEDs and alphanumeric display segments connected in the display matrix array 12.

For this purpose a row decoder 50, which is a SN 74159 available from Texas Instruments, has its 16 outputs connected through inverting and driving transistor switches, indicated generally as 52, to the second (vertical) lines of the display matrix array 12. The emitters of these transistors 52 may be connected through a display enable switch 54 to a power supply so that the displays can be disabled when desired for instructional purposes.

An address counter 56, which is a SN74161 available from Texas Instruments, has its four binary address outputs Q1 through Q4 connected to the inputs A, B, C and D of the row decoder 50 as well as the inputs A, B, C and D of the display buffer memory 46. In this manner, corresponding columns of display elements and the data intended for those display elements have the same address and are simultaneously addressed.

Connected to each of the 8 data outputs from the display buffer memory 46 is an OR gate 58 with an inverter 60 connected to its output. The OR gate is an SN7430 and the inverter 60 is an SN7410, both available from Texas Instruments. They function to detect whether or not any bit is present in a column of addressed display data for purposes of illuminating a display element. If no bit is present, then the address counter 56 is incremented to address the next column of data and power is not applied to the corresponding column of displays. However, if a bit is present, the address counter 56 is held in the same address, the corresponding column of display elements is enabled, and a time delay count is initiated.

A hold counter 62 is provided for performing the time delay count and therefore timing the delay during which a column of display elements are enabled. The four count-output ports Q1 through Q4 of hold counter 62 are connected through an OR gate 64, which is an SN7425, available from Texas Instruments, to the inhibit input G of the row decoder 50. The OR gate 64, functions to inhibit the output from the row decoder 50 whenever the count of the hold counter is 0000 or 1111. In this manner when the hold counter is not counting, the row decoder is disabled and therefore the displays are not energized. However, during the counting of the hold counter 62 the row decoder and therefore the displays are enabled.

The carry output of the hold counter 62 is connected through an inverter 65, formed on the same SN7425, to an input of a NOR gate 66 which is a part of the SN7410 device available from Texas Instruments. The NOR gate 66 also has an input connected to the output C14 of the decoder 42 and another input connected to a NAND gate 68 also formed on the SN7410. The NAND gate 68 has one input connected to the output of the inverter 60, and another input connected to the output of a JK flip-flop 70.

The JK flip-flop 70 is a storage element for controlling the mode of operation of the display. One input of the JK flip-flop 70 is connected to the output C15 of the decoder 42 for selecting the automatic scanning mode in which data from the display buffer memory 46 is cyclically applied to the corresponding display elements connected in the display matrix array 12. The other input of the JK flip-flop 70 is connected to the output C12 of the decoder 42 for selecting the reset mode in which the data is not cycled to the displays. Instead, the address counter 56 is reset to 0000 for the purpose of writing new data into the display buffer memory 46.

Therefore, because of the NOR gate 66 and the NAND gate 68 connected thereto, the address counter 56, which has its clock input connected to the output of the NOR gate 66, is incremented each time a true level appears at the output C14 of the decoder 42, or whenever a carry is produced at the hold counter 62, or whenever the JK flip-flop 70 is in the automatic scanning mode and no bit is present at the addressed column of data appearing at the output pins S1 through S4 of the display buffer memory 46.

The signalling means 14 has a one shot 74 which is an SN74123 available from Texas Instruments. The one shot 74 has its input connected to output C12 of the decoder 42 and provides an output pulse of selected pulse width which is adjustable by potentiometer 80. This pulse can of course be used to control a variety of signalling means including audible signals and light signals. It may for example cause a beep or a light flash whenever the student depresses the correct keys. Alternatively it may be used to cause the substantial decrease in the output level or volume of an electronic instrument. For this purpose I illustrate the coupling of the output pulse from the one shot 74 through an inverter 76 and an override switch 78 to another such circuit. I also illustrate the application of the output pulse from the one shot 74 to a tone generating circuit 81 which may include an audio oscillator, speaker and an electronic switch controlled by the output of the one shot 74.

OPERATION OF THE PREFERRED EMBODIMENT

The preferred embodiment of the invention described above has three modes of operation. However, it should be understood that other modes of operation, and particularly other types of exercises, will become apparent to those skilled in the art from this description.

In the first of the three modes of operation, a composition or exercise may be entered into memory by an instructor via the instruments keyboard for subsequent use by the student.

For this purpose, a footpedal switch means may be connected to the microcomputer for inputting data indicating that keys corresponding to a complete musical step are depressed. The microcomputer may further comprise means for storing each musical step in sequence for providing the stored musical steps of the stored composition. The foot pedal may be one of the special function switches which is referred to above and would be sensed under control of Program 2 and utilized to strobe that data indicated by depressed keys into the computer memory in the conventional manner of strobing data from depressed keys. At this point prepared data can be stored on cassette also. In the second mode, a composition or exercise, which has previously been entered into RAM memory either by an instructor or from the cassette tape, may be played by the student and be monitored by the preferred embodiment of the invention to determine whether the student is playing the composition or exercise correctly. In the third mode of operation, the preferred embodiment displays random notes in octave and literal notation upon the alphanumeric display and determines whether the student plays each note correctly. It may simultaneously modify a decimal readout count by incrementing it for each correct note or decrementing it for each incorrect note.

The instructions for these three modes may be permanently stored in three ROM memories indicated as program 0 for the random note display exercise, program 1 for the playing of an exercise by the student and program 2 for the preparation of a composition or exercise by the instructor. A fourth ROM memory 34 is also provided for transferring data representing the notes of a composition either from the audio cassette player to RAM memory 32 or from the RAM memory 32 to the audio cassette player 22. Since ROM 34, identified as program 3 may be purchased from the manufacturers of the KIM 1 microcomputer and bears No. 6530-003, the instruction for this ROM are not described.

The operation of the preferred embodiment of the invention may begin with the assumption that a musical composition has been recorded on the tape of the audio cassette player 22. Each note for an 88 key piano is recorded as an 8-bit word or byte. Seven bits of the byte define a particular note and the 8th bit is used to indicate whether or not the note is the last note of a chord. Therefore, operation would begin by the transfer of the 8-bit words representing a composition or an exercise to the RAM memory 32 under control of the cassette interface program 34 stored in ROM 3.

After an entire composition has been written into the RAM memory 32, control is then transferred to ROM 1 so that the student may begin to play the composition under control of the keyboard play program 38. In this mode, each note is, in sequence, translated into a format for output to the display buffer memory 46. To do this I prefer to assign 88 bits of RAM memory to define an image of the 88 key piano keyboard. Each byte representing a note is translated to store a bit in the particular one of the 88 memory cells representing the particular note or key. This translation continues until all keys to be simultaneously depressed have had their corresponding bits stored in the 88-bit memory area. After these bits have been written into the 88-bit memory which forms the keyboard image, the microcomputer applies a 5-bit word at its outputs B0 through B4 which decode to an appropriate output at output C12 of the decoder 42 to reset the interface circuitry. This reset output sets the JK flip-flop 70 to prevent the automatic cycling of output data and clears the address counter 56 to 0000.

Thereafter, the first 8 bits from the 88-bit keyboard image portion of the RAM memory are presented to data output terminals A0 through A7 and written into the display buffer memory 46. After the first 8 bits are written into the display buffer memory 46, outputs B0 through B4 of the microcomputer 16 cause an output to appear at output C14 of the decoder 42 which increments the address counter 56 to the next address. Thereupon the next 8 bits are presented at outputs A0 through A7 and similarly written into the display buffer memory 46. This procedure continues until all 88-bits have been written into the display buffer memory 46.

After display buffer memory 46 has had the notes which should be played written into it, the microcomputer provides, at its outputs B0 through B4, a five-bit word which decodes to apply an output level at output C15 of the decoder 42 which in turn switches the JK flip-flop 70 to a state which starts the automatic cycling of the note data to the displays of the display matrix 12. The microcomputer 16 can then go about the task of doing other things while the data in the display buffer memory 46 is automatically cycled to the display matrix array 12.

This automatic cycling is accomplished in the following manner. The eight bits in the display buffer memory 46 which are addressed by the current address appearing at the outputs Q1 through Q4 of the address counter 56, will appear at the outputs S1 through S4 of each of the two RAMs making up the display buffer memory 46. Whenever the JK flip-flop 70 is set to its automatic scanning state and no display bits appear at the outputs of display buffer memory 46, then each clock pulse applied from the microcomputer oscillator 40 to the NAND gate 68 will appear at the output of the NAND gate 68 and be applied to the NOR gate 66. Such a clock pulse will be applied to the clock input of the address counter 56 and will increment the address counter. This incrementing will continue to occur for each clock pulse until a bit for display appears at the output of the display buffer memory 46.

The appearance of any bit at the output of the display buffer memory 46 will shift the state of the output of the OR gate 58 to initiate counting of the hold counter 62. Counting by the hold counter 62 will enable the row decoder 50 by means of the output of the OR gate 64. Thereafter each clock pulse from the microcomputer oscillator 40 will increment the hold counter 62 but will not increment the address counter 56 because of the output of the inverter 60.

The hold counter 62 will continue counting for 16 microcomputer clock pulses during which time the row decoder 50 is enabled at the current address being held in the address counter 56. During counts 1 through 14 of hold counter 62 the particular display or displays for which an output bit appears at the output of the display buffer memory 46 will be illuminated.

Inhibiting the row decoder during counts 0000 and 1111 of hold counter prevents "ghosting" of one row of LED's into another during transition periods of the address counter.

When the hold counter 62 completes its count such that a carry is produced, the carry is applied through the inverter 65 to the NOR gate 66 to increment the address counter 56 to the next address. This procedure than continues in an endless cycle in which the row decoder 50 is enabled and the hold counter counts for 14 counts each time at least one bit appears for display at the output of the display buffer memory 46.

A number of RAM memory cells are assigned to the task of maintaining a count of the number of chords of a composition which have been played. This count represents the student's place in the musical composition and is appropriately translated and written into the display buffer memory 46 along with the particular note data for display on the two-state keyboard display. Therefore, the microcomputer increments this counter register formed in the RAM memory each time a chord is written into the display buffer memory 46.

After the data is written into the display buffer memory 46, the microcomputer 16 then scans the keyboard switches and compares the actual state of the keys to the correct state of the keys as represented by the key data stored in the 88-bit image memory portion of the RAM 32.

To sense the keys, the microcomputer provides a four-bit word at its outputs B0 through B3 which decodes to an output at output C10 of decoder 42. This strobe output will then appear at any of the I/O terminals A0 through A7 of the microcomputer which are connected to closed key switches. These 8-bit key data appearing at input terminals A0 through A7 are then compared to the data in the corresponding 8-bits of RAM memory which are assigned to these 8 keys. If the data is not identical, the microcomputer softwave counter is reset to continue in this comparison loop until the compared data is identical.

If the compared data is identical, the microcomputer 16 then decrements the word appearing at outputs B0 through B3 to similarly apply the strobe to output C9 of the decoder 42. The above described procedure is then repeated. Whenever the compared data is not identical, the microcomputer software counter is reset to loop through the key sensing steps until all compared data is identical.

If this comparison finally shows that the played keys are identical to the keys of the comparison which should be played and that no extra keys are played, the microcomputer 16 then applies a word at its outputs B0 through B3 which decodes to a reset output at decoder output C12 to reset the interfacing circuit so that new display data may be written into the display buffer memory 46. The one-shot 74 is also activated by the reset output to produce a tone or other indication that the student has depressed the correct keys.

If, however, the student depresses the wrong keys the same note data remains in the display buffer memory 46 and the key switch matrix 10 continues to be sensed until the appropriate play is made by the student.

The following three sets of instructions are those which I have used in constructing an embodiment of the invention described above using a KIM-1 microcomputer. This set of instructions is disclosed for the purpose of providing at least one set of instructions which will cause the embodiment illustrated in the figure to operate as described above. These programs operate from the KIM 1 RAM but could easily be relocated to ROM memory. However, it will be understood by those skilled in the art that a very substantial number of additional programs with variations may be developed from the above disclosure by a person of ordinary skill in the art without departing from the spirit of the invention.

| PROGRAM 1-FOR PLAYING AN EXERCISE BY STUDENT | | | | | | | | | | | | | | | | |
|---|---|---|---|---|---|---|---|---|---|---|---|---|---|---|---|---|
| ADDRESS | 0 | 1 | 2 | 3 | 4 | 5 | 6 | 7 | 8 | 9 | A | B | C | D | E | F |
| 0000 | 4C | 0C | 00 | | | | | | | | | | A9 | 00 | 85 | 01 |
| 0010 | 85 | 00 | 85 | 02 | D8 | EA | A9 | 02 | 85 | 07 | A4 | 02 | C8 | D0 | 02 | E6 |
| 0020 | 07 | B1 | 06 | 85 | 03 | C9 | FF | F0 | E3 | C9 | FE | F0 | 2C | 29 | 7F | D0 |
| 0030 | 0C | A2 | 07 | A9 | 00 | 9D | 83 | 17 | CA | 1D | FA | 30 | 1C | A9 | 07 | 25 |
| 0040 | 03 | AA | A9 | 00 | 38 | 2A | CA | 10 | FC | 48 | A9 | 38 | 25 | 03 | 4A | 4A |
| 0050 | 4A | AA | 68 | 5D | 83 | 17 | 9D | 83 | 17 | A5 | 03 | 10 | BF | 84 | 02 | A9 |
| 0060 | 10 | 18 | F8 | 65 | 01 | 85 | 01 | 85 | 04 | A9 | 00 | 85 | 08 | 65 | 00 | D8 |
| 0070 | 85 | 00 | 85 | 05 | A0 | 02 | A9 | 00 | A2 | 03 | 26 | 04 | 26 | 05 | 2A | CA |
| 0080 | 10 | F8 | AA | D0 | 04 | C5 | 08 | F0 | 05 | E6 | 08 | BD | E7 | 1F | 99 | 80 |
| 0090 | 17 | 88 | 10 | E2 | A9 | 30 | 8D | 02 | 17 | A9 | FF | 8D | 01 | 17 | 8D | 03 |
| 00A0 | 17 | 20 | 00 | 01 | EE | 02 | 17 | A2 | 0A | BD | 80 | 17 | 8D | 00 | 17 | 20 |
| 00B0 | 00 | 01 | EE | 02 | 17 | 20 | 00 | 01 | CE | 02 | 17 | CA | 10 | EB | A9 | 27 |
| 00C0 | 8D | 02 | 17 | A2 | 07 | A9 | FF | 5D | 83 | 17 | 9D | 93 | 17 | CA | 10 | F5 |
| 00D0 | 20 | 11 | 01 | F0 | FB | 20 | 1F | 1F | 20 | 11 | 01 | F0 | F3 | 20 | 11 | 01 |
| 00E0 | D0 | FB | 20 | 1F | 1F | 20 | 11 | 01 | D0 | F3 | 4C | 1A | 00 | | | |
| 00F0 | | | | | | | | | | | | | | | | |
| 0100 | A9 | 20 | 4D | 02 | 17 | 8D | 02 | 17 | A9 | 20 | 4D | 02 | 17 | 8D | 02 | 17 |
| 0110 | 60 | A9 | 07 | 8D | 02 | 17 | AA | A9 | 00 | 8D | 01 | 17 | BD | 93 | 17 | 4D |
| 0120 | 00 | 17 | D0 | 08 | CA | CE | 02 | 17 | 10 | F2 | A9 | 00 | 60 | | | |
| 0130 | A9 | 00 | 8D | FA | 17 | A9 | 1C | 8D | FB | 17 | A9 | 4C | 85 | 00 | A9 | 0C |
| 0140 | 85 | 01 | A9 | 00 | 85 | 02 | 4C | 73 | 18 | | | | | | | |
| 0150 | | | | | | | | | | | | | | | | |

| PROGRAM 2-PROGRAM FOR PREPARATION, FROM INSTRUMENTS KEYBOARD, OF DATA FOR USE IN PROGRAM 1 | | | | | | | | | | | | | | |
|---|---|---|---|---|---|---|---|---|---|---|---|---|---|---|
| ADDRESS | 0 | 1 | 2 | 3 | 4 | 5 | 6 | 7 | 8 | 9 | A | B | C | D | F |
| 0000 | 4C | 10 | 00 | | | | | | | | | | | | |
| 0010 | A9 | 1C | 8D | FB | 17 | D8 | A9 | 00 | 85 | FA | 85 | FB | 85 | 03 | 8D | F5 |
| 0020 | 17 | 8D | 01 | 17 | 8D | FA | 17 | A9 | 02 | 8D | F6 | 17 | 85 | 04 | A9 | FF |
| 0030 | 8D | 03 | 17 | 8D | 88 | 17 | 20 | 1F | 1F | 20 | FE | 1E | D0 | F8 | 20 | 1F |
| 0040 | 1F | 20 | FE | 1E | F0 | F8 | 20 | 1F | 1F | 20 | FE | 1E | F0 | F0 | 20 | 6A |
| 0050 | 1F | C9 | 13 | F0 | E1 | C9 | 12 | F0 | 4C | 20 | 80 | 01 | A9 | FF | 91 | 03 |
| 0060 | 20 | 80 | 01 | A9 | 1D | 85 | FA | 85 | FB | 85 | 03 | 8D | F7 | 17 | A5 | 04 |

PROGRAM 2-PROGRAM FOR PREPARATION, FROM INSTRUMENTS KEYBOARD, OF DATA FOR USE IN PROGRAM 1

| ADDRESS | 0 | 1 | 2 | 3 | 4 | 5 | 6 | 7 | 8 | 9 | A | B | C | D | F |
|---|---|---|---|---|---|---|---|---|---|---|---|---|---|---|---|
| 0070 | 8D | F8 | 17 | 20 | 1F | 1F | 20 | FE | 1E | F0 | F8 | 20 | 1F | 1F | 20 FE |
| 0080 | 1E | F0 | F0 | 20 | 6A | 1F | C9 | 13 | D0 | 03 | 4C | 00 | 18 | A2 | 03 06 |
| 0090 | F9 | CA | 10 | FB | 05 | F9 | 85 | F9 | 8D | F9 | 17 | 20 | 1F | 1F | 20 FE |
| 00A0 | 1E | D0 | F8 | F0 | CE | A0 | 01 | A2 | 07 | 8E | 02 | 17 | A9 | FF | 4D 00 |
| 00B0 | 17 | 9D | 80 | 17 | DD | 88 | 17 | F0 | 01 | C8 | CA | 10 | EC | 88 | D0 0A |
| 00C0 | 20 | 80 | 01 | A9 | FE | 91 | 03 | 4C | 50 | 01 | A2 | 00 | 86 | 05 | A0 07 |
| 00D0 | B9 | 80 | 17 | 0A | 90 | 03 | E8 | B0 | FA | D0 | F8 | B9 | 80 | 17 | 59 88 |
| 00E0 | 17 | 0A | 90 | 04 | E6 | 05 | B0 | F9 | D0 | F7 | 88 | 4C | 00 | 01 | 00 |
| 00F0 |   |   |   |   |   |   |   |   |   |   |   |   |   |   |   |
| 0100 | 10 | CE | E4 | 05 | 10 | 12 | 20 | 80 | 01 | 98 | 91 | 03 | E0 | 00 | F0 40 |
| 0110 | A2 | 07 | 9D | 88 | 17 | CA | 10 | FA | A2 | 07 | BD | 80 | 17 | 5D | 88 17 |
| 0120 | 9D | B6 | 17 | CA | 10 | F4 | A2 | 05 | BD | B8 | 17 | 90 | B0 | 17 | CA 10 |
| 0130 | F7 | A9 | 4F | 85 | 06 | A2 | 07 | A9 | 07 | 85 | 05 | 1E | B0 | 17 | 90 07 |
| 0140 | 20 | 80 | 01 | A5 | 06 | 91 | 03 | C6 | 06 | C6 | 05 | 10 | EE | CA | 10 E7 |
| 0150 | A0 | 00 | A9 | 80 | 11 | 03 | 91 | 03 | A2 | 07 | BD | 80 | 17 | 9D | 88 17 |
| 0160 | CA | 10 | F7 | A9 | 10 | 8D | 02 | 17 | A9 | 00 | 8D | 02 | 17 | 38 | F8 65 |
| 0170 | FA | 85 | FA | 90 | 02 | E6 | FB | D8 | 4C | 36 | 00 |   |   |   |   |
| 0180 | E6 | 03 | D0 | 17 | E6 | 04 | A9 | 04 | C5 | 04 | D0 | 0F | A9 | 00 | 85 FA |
| 0190 | 85 | FB | A9 | 4C | 85 | F9 | 68 | 68 | 4C | 4F | 1C | A0 | 00 | 60 |   |

PROGRAM 0-RANDOM NOTE EXERCISE

| ADDRESS | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0000 | A9 | 00 | 8D | FA | 17 | A9 | 1C | 8D | FB | 17 | 4C | 30 | 00 |   |   |   |
| 0010 | 00 | 00 | ED | F6 | F1 | B8 | F7 | FC | B9 | D3 | F9 | F1 | BD | 0D | 0F | 10 |
| 0020 | 12 | 14 | 15 | 17 | 00 |   |   | 00 |   |   |   |   |   |   |   |   |
| 0030 | D8 | A9 | 00 | 85 | 00 | 85 | 01 | 85 | 02 | 85 | 04 | A9 | 02 | 85 | 03 | 85 |
| 0040 | 05 | A9 | 00 | A2 | 07 | 9D | 83 | 17 | CA | 10 | FA | A6 | 03 | B5 | 1D | 85 |
| 0050 | 07 | A6 | 04 | F0 | 09 | CA | F0 | 04 | C6 | 07 | 10 | 02 | E6 | 07 | A6 | 05 |
| 0060 | 18 | A9 | 0C | 65 | 07 | 85 | 07 | CA | 10 | F7 | A9 | 38 | 25 | 07 | 4A | 4A |
| 0070 | 4A | AA | A9 | 07 | 25 | 07 | A8 | 38 | A9 | 00 | 2A | 88 | 10 | FC | 90 | 83 |
| 0080 | 17 | A6 | 03 | B5 | 16 | 85 | 24 | A5 | 04 | 0A | AA | B5 | 10 | 85 | 26 | E8 |
| 0090 | B5 | 10 | 85 | 27 | A6 | 05 | E8 | E8 | BD | E7 | 1F | 85 | 29 | A2 | 02 | B4 |
| 00A0 | 00 | B9 | E7 | 1F | 9D | 80 | 17 | CA | F5 | A9 | 30 | 8D | 02 | 17 | A9 |   |
| 00B0 | FF | 8D | 01 | 17 | 8D | 03 | 17 | 20 | B5 | 01 | EE | 02 | 17 | A2 | 0A | BD |
| 00C0 | 80 | 17 | 8D | 00 | 17 | 20 | B5 | 01 | 20 | 50 | 01 | EA | CE | 02 | 17 | CA |
| 00D0 | 10 | ED | A9 | 27 | 8D | 02 | 17 | 20 | 60 | 01 | D0 | FB | 20 | 57 | 01 | C9 |
| 00E0 | 12 | F0 | 4F | 20 | 60 | 01 | F0 | F4 | 4C | 00 | 01 |   |   |   |   |   |
| 0100 | 20 | 60 | 01 | F0 | C7 | A9 | 00 | 8D | 01 | 17 | A0 | 07 | 8C | 02 | 17 | B9 |
| 0110 | 83 | 17 | 4D | 00 | 17 | C9 | FF | D0 | 1C | 88 | 10 | F0 | A2 | 00 | A9 | 0A |
| 0120 | F6 | 00 | D5 | 00 | F0 | 03 | 4C | 41 | 00 | A9 | 00 | 95 | 00 | E8 | E0 | 03 |
| 0130 | D0 | EC | 4C | 30 | 00 | A2 | 02 | A9 | 00 | D5 | 00 | D0 | 06 | CA | 10 | F7 |
| 0140 | 4C | 9D | 00 | A2 | 00 | D6 | 00 | 10 | F7 | A9 | 09 | 95 | 00 | E8 | 10 | F5 |
| 0150 | EE | 02 | 17 | 20 | B5 | 01 | 60 | A9 | 00 | 8D | 41 | 17 | 20 | 6A | 1F | 60 |
| 0160 | C6 | 03 | 10 | 06 | A9 | 06 | 85 | 03 | C6 | 04 | 10 | 04 | A9 | 02 | 85 | 04 |
| 0170 | C6 | 05 | 10 | 04 | A9 | 03 | 85 | 05 | A9 | FF | 8D | 41 | 17 | 8D | 43 | 17 |
| 0180 | A9 | 14 | 8D | 42 | 17 | A2 | 05 | A9 | 00 | 8D | 40 | 17 | CE | 42 | 17 | CE |
| 0190 | 42 | 17 | B5 | 24 | 8D | 40 | 17 | A0 | FF | 88 | D0 | FD | CA | 10 | E8 | A9 |
| 01A0 | 00 | 8D | 01 | 17 | A0 | 07 | 8C | 02 | 17 | 8D | 00 | 17 | C9 | FF | D0 | 04 |
| 01B0 | 88 | 10 | F3 | C8 | 60 | A0 | 01 | A9 | 20 | 4D | 02 | 17 | 8D | 02 | 17 | 88 |
| 01C0 | 10 | F5 | 60 |   |   |   |   |   |   |   |   |   |   |   |   |   |

It is to be understood that while the detailed drawings and specific examples given describe preferred embodiments of the invention, they are for the purpose of illustration only, that the apparatus of the invention is not limited to the precise details and conditions disclosed, that various changes may be made therein without departing from the spirit of the invention which is defined by the following claims.

I claim:

1. An apparatus for use as an educational aid in learing to play a keyboard musical instrument, said apparatus comprising:
   (a) a musical instrument keyboard;
   (b) a plurality of illuminable, two-state displays, one display in spatial correspondence with each key of said keyboard, said illuminable displays being electrically connected in a display matrix array;
   (c) a plurality of alphanumeric digit displays having their segments electrically connected in said display matrix array;
   (d) switch means mechanically connected to each key of said keyboard for detecting each key depression, said switch means being electrically connected in a switch matrix array;
   (e) a signalling means;
   (f) interfacing digital data circuit means connected to said displays, said switch means and said signalling means, for interfacing data transfer from said switch means to a microcomputer and from a microcomputer to said displays and said signalling means and for actuating said displays; and
   (g) a digital data microcomputer connected to said switch means and said interfacing circuit means, said microcomputer including stored instructions and a stored sequence of musical steps for comparing each of said stored musical steps in sequence to key depressions and signalling whether each of said steps and said depressions are identical;
wherein said interfacing means includes a decoder circuit means and wherein said switch matrix array has a first set of lines connected to input ports of said microcomputer and its second set of lines connected to outputs of said decoder means, said decoder means having its inputs connected to output ports of said microcomputer, and wherein said switch means includes a series connected single pole, single throw switch and a diode connected to electrical intersections of the sets of lines of said switch matrix array.

2. An apparatus according to claim 1 wherein said interfacing means includes a display buffer memory for storing data for display and having its outputs connected to a first set of lines of said display matrix array and wherein said first set of lines of said switch matrix array are connected to input/output terminals of said microcomputer and also to input terminals of said display buffer memory whereby the same input/output ports of said microcomputer can be selected for the input of key depression data from said switch means and for the output of display data to said display buffer memory.

3. An apparatus according to claim 2 wherein said interfacing means further includes circuit means connected to other outputs of said decoder means, to address inputs of said display buffer memory and to the second set of lines of said display matrix array for cyclically applying the data from said display buffer memory to said displays.

4. An apparatus according to claim 3 wherein said interfacing means further includes display address counting and detecting means for detecting the presence or absence of a bit for display at an output of said display buffer memory, for incrementing the address input to said display buffer memory in response to the absence of a display bit and for holding the address input and illuminating the display for a selected time interval in response to the presence of a display bit.

5. An apparatus for use as an educational aid in learning to play a keyboard musical instrument, said apparatus comprising;
 (a) a musical instrument keyboard;
 (b) a plurality of illuminable, two-state displays, one display in spatial correspondence with each key of said keyboard, said illuminable displays being electrically connected in a display matrix array;
 (c) a plurality of alphanumeric digit displays having their segments electrically connected in said display matrix array;
 (d) switch means mechanically connected to each key of said keyboard for detecting each key depression, said switch means being electrically connected in a switch matrix array;
 (e) a signalling means;
 (f) interfacing digital data circuit means connected to said displays, said switch means and said signalling means, for interfacing data transfer from said switch means to a microcomputer and from a microcomputer to said displays and said signalling means and for actuating said displays;
 (g) a digital data microcomputer connected to said switch means and said interfacing circuit means, said microcomputer including stored instructions and a stored sequence of musical steps for comparing each of said stored musical steps in sequence to key depressions and signalling whether each of said steps and said depressions are identical; and
 (h) a special function selector switch means connected in said switch matrix array for permitting the instrument keys to be used for manually selecting additional modes of operation.

6. An apparatus for use as an educational aid in learning to play a keyboard musical instrument, said apparatus comprising:
 (a) a musical instrument keyboard;
 (b) a plurality of illuminable, two-state displays, one display in spatial correspondence with each key of said keyboard, said illuminable displays being electrically connected in a display matrix array;
 (c) a plurality of alphanumeric digit displays having their segments electrically connected in said display matrix array;
 (d) switch means mechanically connected to each key of said keyboard for detecting each key depression, said switch means being electrically connected in a switch matrix array;
 (e) a signalling means;
 (f) interfacing digital data circuit means connected to said displays, said switch means and said signalling means, for interfacing data transfer from said switch means to a microcomputer and from a microcomputer to said displays and said signalling means and for actuating said displays;
 (g) a digital data microcomputer connected to said switch means and said interfacing circuit means, said microcomputer including stored instructions and a stored sequence of musical steps for comparing each of said stored musical steps in sequence to key depressions and signalling whether each of said steps and said depressions are identical; and
 (h) means for displaying in sequence on said alphanumeric displays in literal and octave notation, a series of randomly selected notes, for comparing each such random note to a played note and for displaying another such random note in response to the depression of a key which is identical to the currently displayed note.

7. An apparatus according to claim 6 further comprising means for displaying a cumulative, algebraic count of the number of said comparisons which result in identity and non-identity.

8. An apparatus for use as an educational aid in learning to play a keyboard musical instrument, said apparatus comprising:
 (a) a musical instrument keyboard;
 (b) a plurality of illuminable, two-state displays, one display in spatial correspondence with each key of said keyboard, said illuminable displays being electrically connected in a display matrix array;
 (c) a plurality of alphanumeric digit displays having their segments electrically connected in said display matrix array;
 (d) switch means mechanically connected to each key of said keyboard for detecting each key depression, said switch means being electrically connected in a switch matrix array;
 (e) a signalling means;
 (f) interfacing digital data circuit means connected to said displays, said switch means and said signalling means, for interfacing data transfer from said switch means to a microcomputer and from a microcomputer to said displays and said signalling means and for actuating said displays;

(g) a digital data microcomputer connected to said switch means and said interfacing circuit means, said microcomputer including stored instructions and a stored sequence of musical steps for comparing each of said stored musical steps in sequence to key depressions and signalling whether each of said steps and said depressions are identical; and (h) a foot pedal switch means connected to said microcomputer for inputing data indicating that keys corresponding to a complete musical step are depressed and wherein said microcomputer further comprises means for storing each said musical step in sequence for providing said stored musical steps.

* * * * *